United States Patent
Lin et al.

(10) Patent No.: US 8,948,146 B2
(45) Date of Patent: Feb. 3, 2015

(54) FEMTOCELL, FEMTOCELL GATEWAY AND ACCESS REJECTION METHOD THEREOF

(75) Inventors: Ching Lun Lin, Taoyuan County (TW); Jian-Chian Chiou, New Taipei (TW); Li-Wei Huang, Keelung (TW); Yao-Hsin Chen, Taichung (TW); Chun-Hao Yeh, New Taipei (TW); Shao-Wei Huang, Kaohsiung (TW)

(73) Assignee: Institute For Information Industry, Taipei (TW)

( * ) Notice: Subject to any disclaimer, the term of this patent is extended or adjusted under 35 U.S.C. 154(b) by 596 days.

(21) Appl. No.: 13/195,260

(22) Filed: Aug. 1, 2011

(65) Prior Publication Data

US 2012/0300757 A1 Nov. 29, 2012

(30) Foreign Application Priority Data

May 27, 2011 (TW) .............................. 100118583 A (51) Int. Cl.
*H04W 4/00* (2009.01)
*H04W 48/02* (2009.01)
*H04W 12/08* (2009.01)
(Continued)

(52) U.S. Cl.
CPC .............. *H04W 48/02* (2013.01); *H04W 12/08* (2013.01); *H04W 84/045* (2013.01); *H04W 8/186* (2013.01)
USPC .................. 370/338; 370/395.21; 370/395.31

(58) Field of Classification Search
CPC ........................ H04W 84/12; H04L 2012/5629
USPC .......... 370/338, 395.2, 395.21, 395.3, 395.31
See application file for complete search history.

(56) References Cited

U.S. PATENT DOCUMENTS

| 6,654,452 B1 * | 11/2003 | Murray et al. ................. 379/197 |
| 2009/0305671 A1 * | 12/2009 | Luft et al. ..................... 455/411 |
| 2010/0112980 A1 | 5/2010 | Horn et al. |

(Continued)

FOREIGN PATENT DOCUMENTS

| CN | 101998442 A | 3/2011 |
| TW | 201117582 A1 | 5/2011 |

OTHER PUBLICATIONS

Office Action to the corresponding Taiwan Patent Application No. 100118583 rendered by Taiwan Intellectual Property Office (TIPO) on May 23, 2014, 10 pages (including English translation).

(Continued)

*Primary Examiner* — Christopher Grey
(74) *Attorney, Agent, or Firm* — Skaar Ulbrich Macari, P.A.

(57) ABSTRACT

A femtocell, a femtocell gateway and an access rejection method thereof are provided. A wireless network system comprises a wireless device, a plurality of the femtocells, the femtocell gateway and a core network server. The wireless device has a Subscriber Identification and the core network server stores a Closed Subscribers Group Identification of the femtocells. The femtocell gateway receives an access rejection message corresponding to the Subscriber Identification of the wireless device from the core network server, and transmits the access rejection message to the femtocells. Each femtocell records the Subscriber Identification in a rejection list thereof, and it is capable of adding/deleting Subscriber Identifications in its rejection list. When each femtocell receives the Subscriber Identification of the wireless device again and determines that the Subscriber Identification has been recorded in the rejection list thereof, each femtocell immediately terminates a wireless connection from the wireless device.

10 Claims, 7 Drawing Sheets

(51) Int. Cl.
*H04W 84/04* (2009.01)
*H04W 8/18* (2009.01)

(56) References Cited

U.S. PATENT DOCUMENTS

2011/0014896 A1 1/2011 Hsieh
2011/0103303 A1 5/2011 Hsu et al.
2012/0147872 A1* 6/2012 Zisimopoulos et al. ...... 370/338
2014/0038599 A1* 2/2014 Bienas et al. ................. 455/434

OTHER PUBLICATIONS

Office Action to the corresponding Chinese Patent Application No. 201110198482.2 rendered by the China Patent Office (SIPO) on Jun. 5, 2014, 11 pages (including English translation).

* cited by examiner

FEMTOCELL, FEMTOCELL GATEWAY AND ACCESS REJECTION METHOD THEREOF

PRIORITY

This application claims priority to Taiwan Patent Application No. 100118583, filed on May 27, 2011, which is hereby incorporated herein by reference in its entirety.

FIELD

The present invention relates to a femtocell, a femtocell gateway and an access rejection method thereof. More particularly, according to the femtocell, the femtocell gateway and the access rejection method thereof of the present invention, a subscriber access rejection message is transmitted from the femtocell gateway to the femtocell and is recorded by the femtocell into a rejection list, and the femtocell terminates a wireless connection with a wireless device when the femtocell determines that a subscriber identification code of the wireless device has been recorded in the rejection list.

BACKGROUND

One of the characteristics of the modern cellular network is that the bandwidth thereof is shared among all subscribers within coverage of a particular base station. Therefore, for subscribers in outdoor environments, a bandwidth allocated to each of the subscribers is inversely proportional to the number of effective subscribers in the coverage. Hence, as the number of subscribers of wireless mobile communication networks grows rapidly, burden of outdoor cellular base stations (BSs) becomes increasingly heavier and the bandwidth available to each subscriber becomes increasingly smaller. To solve this problem, many service providers have put great efforts in development of femtocells.

Femtocells are a kind of subminiature low-power base station specially designed for indoor use, and operate in a licensed wireless frequency band, e.g., a frequency band of the Worldwide Interoperability for Microwave Access (WiMAX) network, a frequency band of the Long Term Evolution (LTE) network or a frequency band of the Third Generation (3G) wireless communication network. Since femtocells are simple in structure, cheap in price and easy to install, it is economical to use a femtocell to replace a cellular base station for wireless signal coverage in indoor environments. Furthermore, when a mobile device enters a signal coverage of a femtocell, the cellular base station will be replaced by the femtocell to provide services necessary for the mobile device; this can not only enhance the signal strength in the indoor environments, but also prevent the mobile device from contending for network resources with other mobile devices in the signal coverage of the cellular base station.

Currently in the framework of femtocells, a Closed Subscribers Group mechanism is adopted for access control. In order to verify whether a wireless device can access a femtocell, this mechanism specifies that a verification message must be transmitted through a femtocell, a security gateway, a femtocell gateway all the way to a core network server. However, since the verification message must be transmitted to the core network server for processing in the aforesaid verifying process, the verification duration becomes too long. This gives malicious users an opportunity to disturb normal verification and connection processes of legal subscribers and to occupy the network transmission performance of the femtocell by initiating a denial-of-service attack (bandwidth consumption) simply through repeated log-in attempts.

In view of this, an urgent need exists in the art to provide an access rejection method as well as a femtocell and a femtocell gateway adopting the access rejection method so as to effectively reduce impacts caused by attacks from malicious users.

SUMMARY

An objective of the present invention is to provide a femtocell, a femtocell gateway and an access rejection method thereof. In detail, after receiving a subscriber access rejection message corresponding to a subscriber identification code of a wireless device, the femtocell gateway of the present invention transmits a subscriber access rejection message to femtocells having the same closed subscribers group identification code. The femtocell of the present invention records the subscriber identification code in a rejection list and terminates a wireless connection with the wireless device after receiving the subscriber access rejection message. Furthermore, when the femtocell of the present invention receives the subscriber identification code from the wireless device again and determines that the subscriber identification code has been recorded in the rejection list, the femtocell terminates a wireless connection with the wireless device immediately.

Further speaking, when a malicious user makes an attack through repeated log-in attempts, the prior art verifying process requires that a subscriber identification code of the malicious user must be transmitted to a core network each time a log-in attempt is made so as to recognize whether the malicious user is a legal user. In contrast, the femtocell of the present invention can use a rejection list to determine whether the malicious user is a legal one, and reject the verification process of the malicious user straightforwardly and terminate a wireless connection with the malicious user immediately after determining that the malicious user is an illegal one. Thereby, the femtocell, the femtocell gateway and the access rejection method thereof of the present invention can effectively reduce the impacts caused by attacks from malicious users.

To achieve the aforesaid objective, certain embodiments of the present invention provide a femtocell. A wireless network system comprises a wireless device, a femtocell gateway, a core network server and the femtocell. The wireless device has a subscriber identification code, and the core network server stores a closed subscribers group identification code of the femtocell. The femtocell comprises a wireless network interface, a wired network interface, a storage and a processor. The wireless network interface is configured to build a first wireless connection with the wireless device, and to receive the subscriber identification code from the wireless device via the first wireless connection. The wired network interface is configured to build a wired connection with the femtocell gateway, to transmit the subscriber identification code to the femtocell gateway via the wired connection, to receive a subscriber identification validation message from the femtocell gateway via the wired connection, and to receive a subscriber access rejection message coming from the core network server from the femtocell gateway via the wired connection. The storage is configured to store the subscriber identification code in a rejection list. The processor is electrically connected to the wireless network interface, the wired network interface and the storage, and is configured to record the subscriber identification code in the rejection list of the storage according to the subscriber access rejection message and to instruct the wireless network interface to terminate the first wireless connection.

To achieve the aforesaid objective, certain embodiments of the present invention provide a femtocell gateway. A wireless network system comprises a wireless device, a first femtocell, a core network server and the femtocell gateway. The wireless device has a subscriber identification code, and the core network server stores a closed subscribers group identification code of the femtocell. The femtocell gateway comprises a wired network interface and a processor. The wired network interface is configured to implement the following operations: building a first wired connection with the femtocell; receiving the subscriber identification code from the first femtocell via the first wired connection; transmitting a subscriber identification validation message corresponding to the subscriber identification code to the first femtocell via the first wired connection; building a second wired connection with the core network server; transmitting the subscriber identification code to the core network server via the second wired connection; receiving a subscriber access rejection message from the core network server via the second wired connection; transmitting the subscriber access rejection message to the first femtocell via the first wired connection. The processor is electrically connected to the wired network interface, and is configured to determine that a second femtocell has the closed subscribers group identification code. The wired network interface further builds a third wired connection with the second femtocell and transmits the subscriber access rejection message to the second femtocell via the third wired connection.

To achieve the aforesaid objective, certain embodiments of the present invention provide an access rejection method for use in a femtocell. A wireless network system comprises a wireless device having a subscriber identification code, the femtocell, a femtocell gateway and a core network server storing a closed subscribers group identification code of the femtocell. The femtocell comprises a wireless network interface, a wired network interface, a storage and a processor electrically connected to the wireless network interface, the wired network interface, and the storage. The access rejection method comprises the steps of: (a) enabling the wireless network interface to build a first wireless connection with the wireless device; (b) enabling the wireless network interface to receive the subscriber identification code from the wireless device via the first wireless connection; (c) enabling the wired network interface to build a wired connection with the femtocell gateway; (d) enabling the wired network interface to transmit the subscriber identification code to the femtocell gateway via the wired connection; (e) enabling the wired network interface to receive a subscriber identification validation message from the femtocell gateway via the wired connection; (f) enabling the wired network interface to receive a subscriber access rejection message coming from the core network server from the femtocell gateway via the wired connection; (g) enabling the storage to store the subscriber identification code in a rejection list; and (h) enabling the processor to record the subscriber identification code in the rejection list of the storage according to the subscriber access rejection message and instruct the wireless network interface to terminate the first wireless connection.

To achieve the aforesaid objective, certain embodiments of the present invention provide an access rejection method for use in a femtocell gateway. A wireless network system comprises a wireless device having a subscriber identification code, a first femtocell, the femtocell gateway and a core network server storing a closed subscribers group identification code of the femtocell. The femtocell gateway comprises a wired network interface and a processor electrically connected to the wired network interface. The access rejection method comprises the steps of: (a) enabling the wired network interface to build a first wired connection with the femtocell; (b) enabling the wired network interface to receive the subscriber identification code from the first femtocell via the first wired connection; (c) enabling the wired network interface to transmit a subscriber identification validation message corresponding to the subscriber identification code to the first femtocell via the first wired connection; (d) enabling the wired network interface to build a second wired connection with the core network server; (e) enabling the wired network interface to transmit the subscriber identification code to the core network server via the second wired connection; (f) enabling the wired network interface to receive a subscriber access rejection message from the core network server via the second wired connection; (g) enabling the wired network interface to transmit the subscriber access rejection message to the first femtocell via the first wired connection; (h) enabling the processor to determine that a second femtocell has the closed subscribers group identification code; (i) enabling the wired network interface to build a third wired connection with the second femtocell; and (j) enabling the wired network interface to transmit the subscriber access rejection message to the second femtocell via the third wired connection.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to example embodiments thereof. However, these example embodiments are not intended to limit the present invention to any specific example, embodiment, environment, applications or particular implementations described in these example embodiments. Therefore, description of these embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
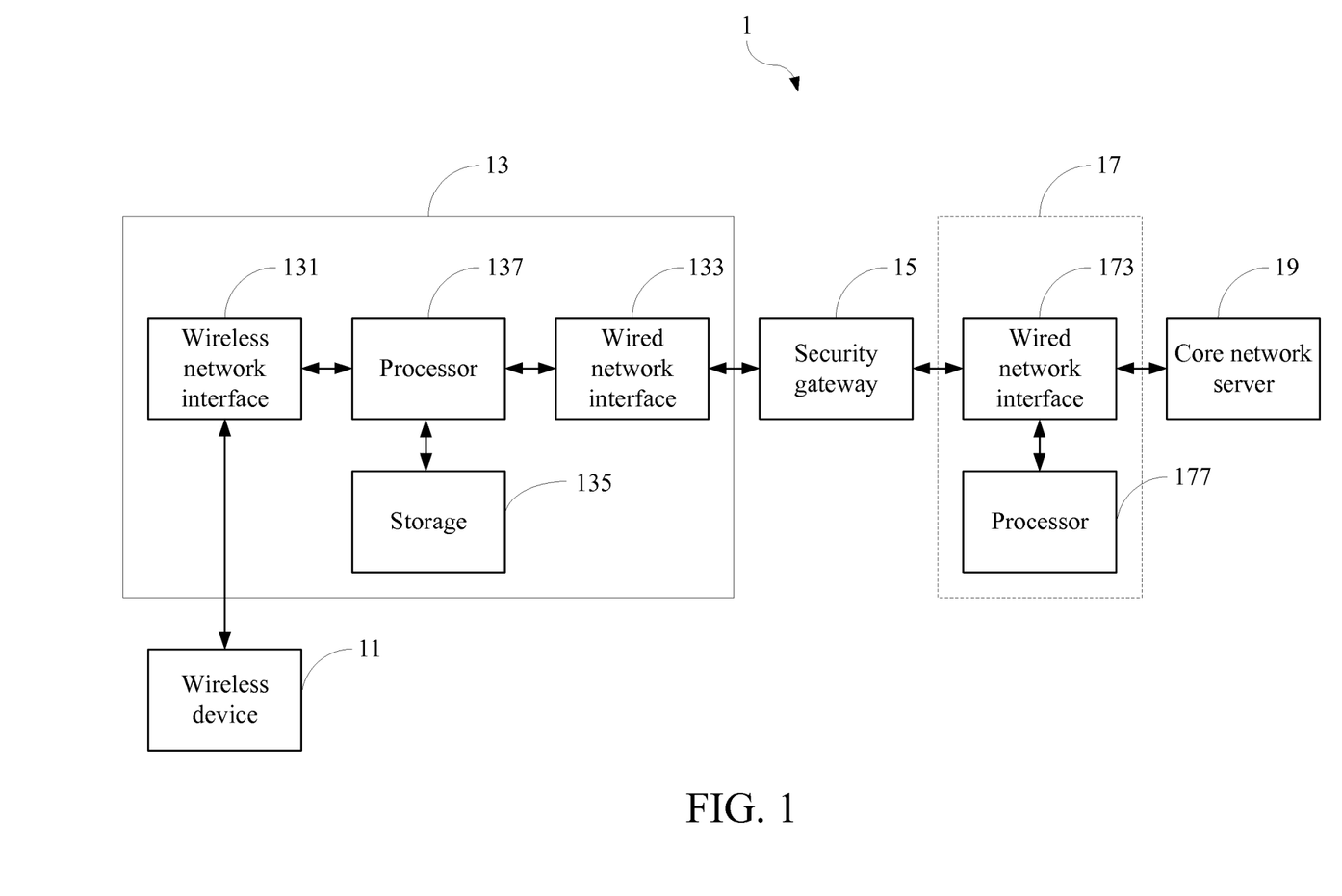
FIG. 1 is a schematic view illustrating connections of a wireless network system 1.
Figure 2:
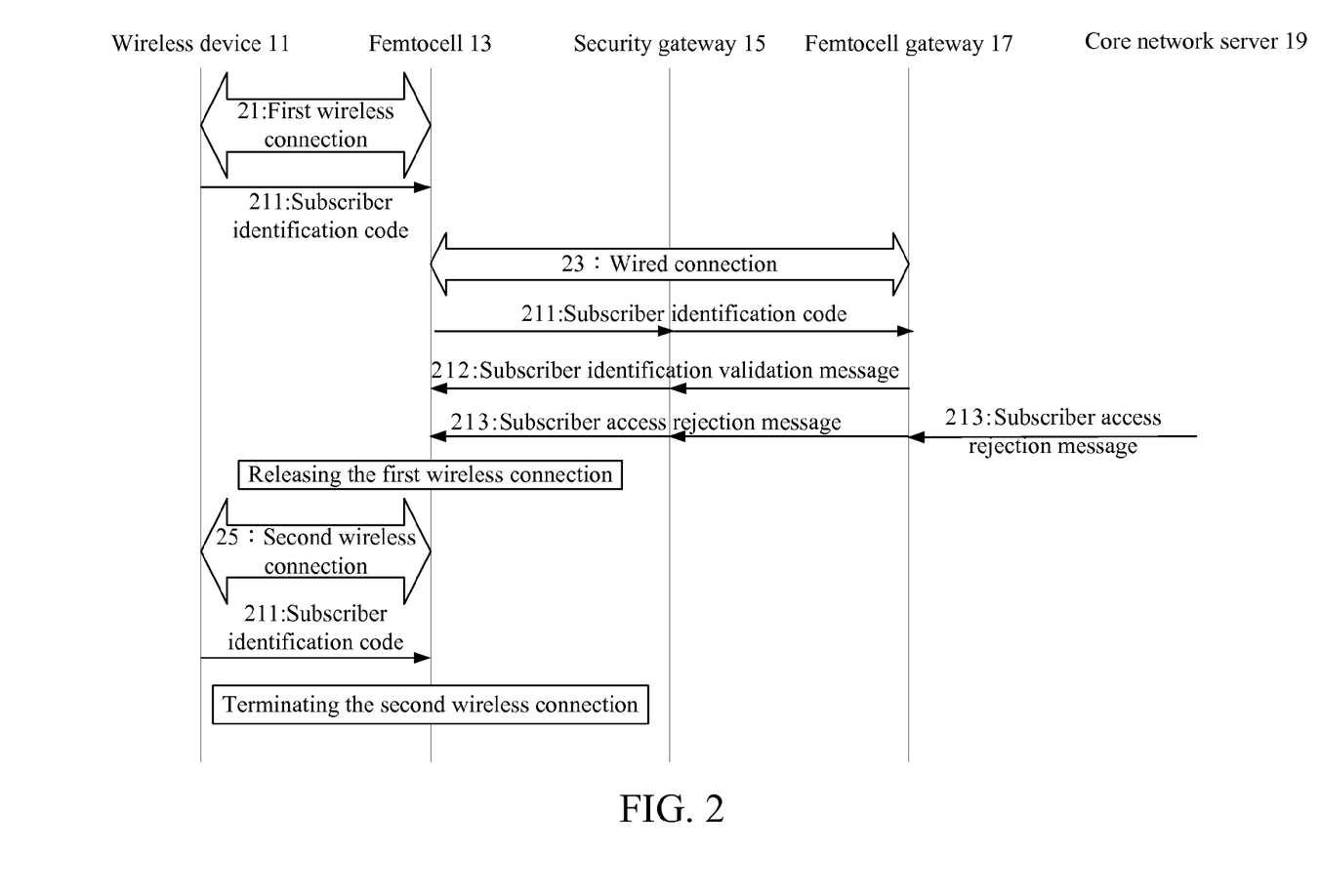
FIG. 2 is a schematic view illustrating operations of a femtocell 13.
Figure 3:
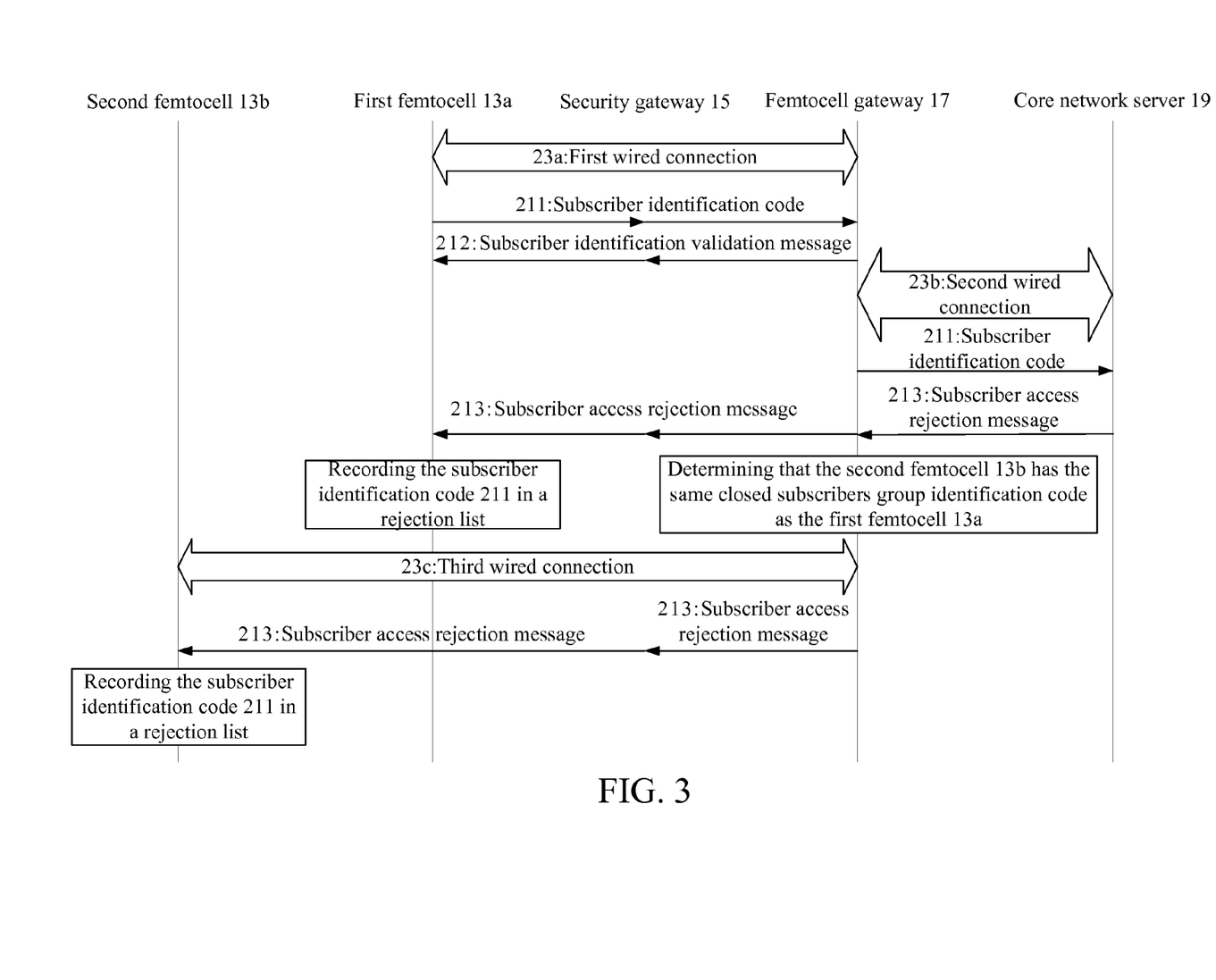
FIG. 3 is schematic view illustrating operations of a femtocell gateway 17.

A first embodiment of the present invention is a wireless network system 1, which will be described with reference to FIGS. 1 to 3. FIG. 1 is a schematic view illustrating connections of a wireless network system 1, FIG. 2 is a schematic view illustrating operations of a femtocell 13, and FIG. 3 is schematic view illustrating operations of a femtocell gateway 17. For ease of understanding, the wireless network system 1 of the first embodiment of the present invention is a third generation (3G) wireless communication network system. However, the wireless network system 1 may also be other communication network systems in other embodiments, but is not merely limited to the 3G wireless communication network system.

As shown in FIG. 1, the wireless network system 1 comprises a wireless device 11, a femtocell 13, a security gateway 15, a femtocell gateway 17 and a core network server 19. The femtocell 13 comprises a wireless network interface 131, a wired network interface 133, a storage 135 and a processor 137. The processor 137 is electrically connected to the wireless network interface 131, the wired network interface 133 and the storage 135. The femtocell gateway 17 comprises a wired network interface 173 and a processor 177 electrically connected to the wired network interface 173. The processor 137 of the femtocell 13 and the processor 177 of the femtocell gateway 17 can perform operations of conventional femtocells and femtocell gateways, so no further description will be made thereon in this embodiment.

Furthermore, the wireless network interface 131 is configured to build a wireless connection with the wireless device 11, the wired network interface 133 is configured to build a wired connection with the wired network interface 173 via the security gateway 15, and the wired network interface 173 is configured to further build a wired connection with the core network server 19. The security gateway 15 is configured to encrypt/decrypt a signal transmitted between the wired network interface 133 and the wired network interface 173 to improve security of the signal transmissions. Since the security gateway 15 substantially has no effect on operations of the wireless network system 1 in the present invention, signal transmissions between the wired network interface 133 and the wired network interface 173 may be accomplished without passing though the security gateway 15 in other embodiments.

Operation principles of the femtocell 13 are shown in FIG. 2. As shown in FIG. 2, the wireless network interface 131 of the femtocell 13 is configured to build a wireless connection 21 with the wireless device 11 so that the femtocell 13 can receive a subscriber identification code 211 from the wireless device 11 via the first wireless connection 21. It shall be appreciated that the first wireless connection 21 merely acts as a bridge for wireless resource communications between the femtocell 13 and the wireless device 11 and how the first wireless connection 21 is built is well known in the art, so no further description will be made herein. Additionally, the subscriber identification code 211 is used to identify an identity of the wireless device 11, and may be an international mobile subscriber identity or a subscriber identity module code for example.

The wired network interface 133 of the femtocell 13 is configured to build a wired connection 23 with the wired network interface 173 of the femtocell gateway 17 via the security gateway 15. The femtocell 13 can transmit the subscriber identification code 211 to the femtocell gateway 17 via the wired connection 23, and receive a subscriber identification validation message 212 from the femtocell gateway 17 via the wired connection 23. It shall be appreciated that the wired connection 23 mainly acts as a bridge for identity verification between the femtocell 13 and the femtocell gateway 17 and how the wired connection 23 is built is well known in the art, so no further description will be made herein.

Furthermore, the femtocell 13 can receive a subscriber access rejection message 213 coming from the core network server 19 from the femtocell gateway 17 via the wired connection 23. The subscriber access rejection message 213 corresponds to the subscriber identification code 211 of the wireless device 11 and is used to indicate that the wireless device 11 has no right to access the femtocell 13. The operation principles between the femtocell gateway 17 and the core network server 19 will be detailed later.

After the wired network interface 173 has received the subscriber access rejection message 213 coming from the core network server 19 from the femtocell gateway 17, the processor 137 of the femtocell 13 records the subscriber identification code 211 into a rejection list stored in the storage 135 according to the subscriber access rejection message 213, and instructs the wireless network interface 131 to terminate the first wireless connection 21. So far, the femtocell 13 has verified that the wireless device 11 has no right to access the femtocell 13.

Next, how the femtocell 13 overcomes denial-of-service attacks initiated by malicious users through repeated log-in attempts will be described. It is assumed that the wireless device 11 is a malicious user and issues a verification request to the femtocell 13 again. In detail, the wireless network interface 131 of the femtocell 13 firstly builds a second wireless connection 25 with the wireless device 11 according to the verification request so as to receive the subscriber identification code 211 from the wireless device 11 via the second wireless connection 25. Next, the processor 137 of the femtocell 13 determines whether the rejection list of the storage 135 comprises the subscriber identification code 211. If the subscriber identification code 211 of the wireless device 11 has already been recorded in the rejection list, then the processor 137 updates the rejection list of the storage 135 and immediately instructs the wireless network interface 131 to terminate the second wireless connection 25.

In detail, the femtocell 13 and the femtocell gateway 17 make processing according to a normal verifying procedure when the wireless device 11 issues the verification request for the first time. However, after the first verification on the wireless device 11 fails, the femtocell 13 determines that the wireless device 11 is likely to be a malicious user and records the subscriber identification code 211 of the wireless device 11 in the storage of the femtocell 13. When the wireless device 11 initiates a denial-of-service attack through repeated log-in attempts, the processor 137 of the femtocell 13 determines whether the subscriber identification code 211 of the wireless device 11 has been recorded in the rejection list of the storage 135. If the answer is "yes", then the femtocell 13 updates the rejection list of the storage 135 and immediately instructs the wireless network interface 131 to terminate the second wireless connection 25 instead of performing a complete verification again according to the normal verifying procedure (i.e., it is unnecessary for the security gateway 15, the femtocell gateway 17 and the core network server 19 to be involved in the verifying procedure). Thereby, impacts caused by verifying the attack from the malicious user (e.g., the impact on the normal verifying procedure of legal users and the impact on the network transmission performance of the femtocell) can be reduced.

On the other hand, the femtocell 13 of the present invention has a recovery mechanism, which is intended to prevent the possibility that a legal user falsely determined as a malicious user is permanently rejected. In detail, after the wired network interface 173 has received the subscriber access rejection message 213 coming from the core network server 19 from the femtocell gateway 17, the processor 137 of the femtocell 13 may further record the number of rejections and a time stamp corresponding to the subscriber identification code 211 into the rejection list of the storage 135. It shall be appreciated that, the number of rejections is a count number; i.e., each time the subscriber identification code 211 is recorded in the rejection list, the number of rejections is incremented by one. Additionally, the time stamp is used to represent a time at which the subscriber identification code 211 is recorded in the rejection list, and is updated each time the subscriber identification code 211 is recorded in the rejection list.

Furthermore, the processor 137 of the femtocell 13 may calculate a rejection duration of the subscriber identification code 211 according to the number of rejections and the time stamp. For example, the processor 137 of the femtocell 13 may define a freezing duration $T_f = 2^{(\text{the number of rejections} - 1)}$ as a penalty for the subscriber identification code 211, and further define that the rejection duration is equal to the freezing duration plus the time stamp. Thus, the processor 137 of the femtocell 13 will remove the subscriber identification code 211 from the rejection list of the storage 135 once the current system time exceeds the rejection duration (i.e., once the rejection duration expires).

By use of the aforesaid recovery mechanism, the larger the number of attacks is, the longer the rejection duration imposed by the femtocell 13 will be. Additionally, if a legal user is falsely determined as a malicious user due to various external factors and is rejected, the recovery mechanism may also allow the rejection to be terminated after a period of time.

Operation principles of the femtocell gateway 17 are shown in FIG. 3. It shall be firstly noted that, the first femtocell 13a is equivalent to the femtocell 13, and the first wired connection 23a is equivalent to the wired connection 23. Additionally, signal transmissions between the first femtocell 13a and the femtocell gateway 17 are equivalent to the signal transmissions between the femtocell 13 and the femtocell gateway 17.

As shown in FIG. 3, the wired network interface 173 of the femtocell gateway 17 is configured to build a first wired connection 23a with the first femtocell 13a via the security gateway 15. The femtocell gateway 17 can receive the subscriber identification code 211 from the first femtocell 13a via the first wired connection 23a, and transmit a subscriber identification validation message 212 corresponding to the subscriber identification code 211 to the first femtocell 13a via the first wired connection 23a. It shall be appreciated that, the subscriber identification validation message 212 is only used to verify whether the subscriber identification code 211 is a legal one, but does not indicate that a wireless device having the subscriber identification code 211 has a right to access the first femtocell 13a.

The wired network interface 173 of the femtocell gateway 17 is further configured to build a second wired connection 23b with the core network server 19. The femtocell gateway 17 can transmit the subscriber identification code 211 to the core network server 19 via the second wired connection 23b and receive a subscriber access rejection message 213 from the core network server 19 via the second wired connection 23b. It shall be noted that a closed subscribers group identification code of the first femtocell 13a is stored in the core network server 19, and the core network server 19 further verifies whether the wireless device having the subscriber identification code 211 can access the first femtocell 13a according to the closed subscribers group identification code and the subscriber identification code 211. If the answer is "yes", then the core network server 19 transmits a subscriber access acknowledgement (ACK) (not shown) message to the femtocell gateway 17 via the second wired connection 23b. Otherwise, if the answer is "no", then the core network server 19 transmits a subscriber access rejection message 213 to the femtocell gateway 17 via the second wired connection 23b.

The femtocell gateway 17 further transmits the subscriber access rejection message 213 to the first femtocell 13a via the first wired connection 23a after receiving the subscriber access rejection message 213 from the core network server 19. Upon receiving the subscriber access rejection message 213 from the femtocell gateway 17, the first femtocell 13a further records the subscriber identification code 211 in a rejection list according to the subscriber access rejection message 213.

Furthermore, the processor 177 of the femtocell gateway 17 may be configured to determine whether a second femtocell 13b has the closed subscribers group identification code. If the answer is "yes", then the wired network interface 173 of the femtocell gateway 17 can build a third wired connection 23c with the second femtocell 13b. The femtocell gateway 17 further transmits a subscriber access rejection message 213 to the second femtocell 13b via the third wired connection 23c. The second femtocell 13b further records the subscriber identification code 211 in a rejection list after receiving the subscriber access rejection message 213 from the femtocell gateway 17.

In detail, the femtocell gateway 17 can transmit the subscriber access rejection message 213 to femtocells having the same closed subscribers group identification code. When a malicious user attempts to attack a femtocell, other femtocells having the same closed subscribers group identification code as this femtocell can also learn the subscriber identification code 211 of the malicious user by receiving the subscriber access rejection message 213 simultaneously and record the subscriber identification code 211 in the rejection list to extend the protection range.

Figure 4A:
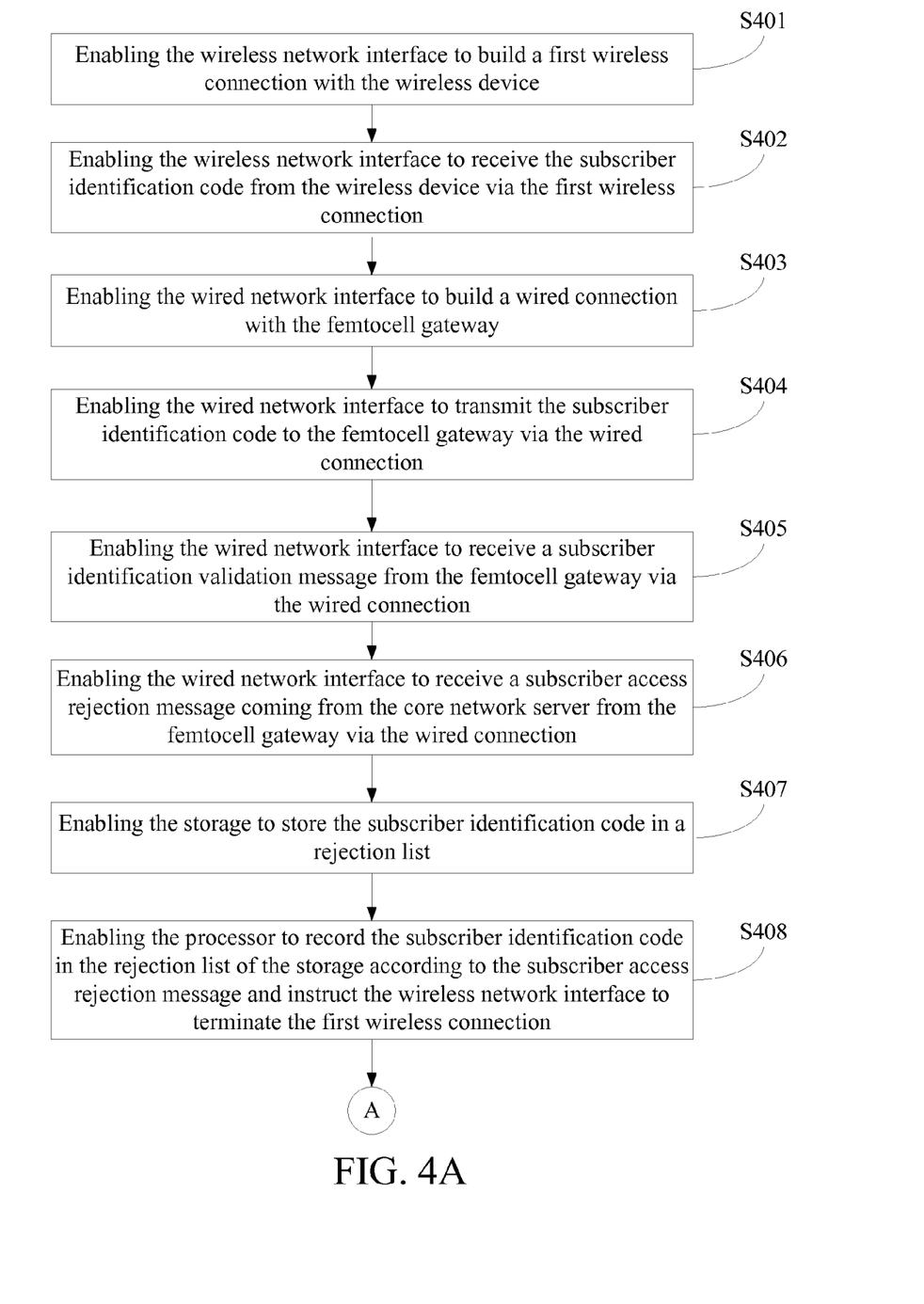
FIGS. 4A-4C show a flowchart diagram illustrating operations a femtocell according to a second embodiment.
Figure 4B:
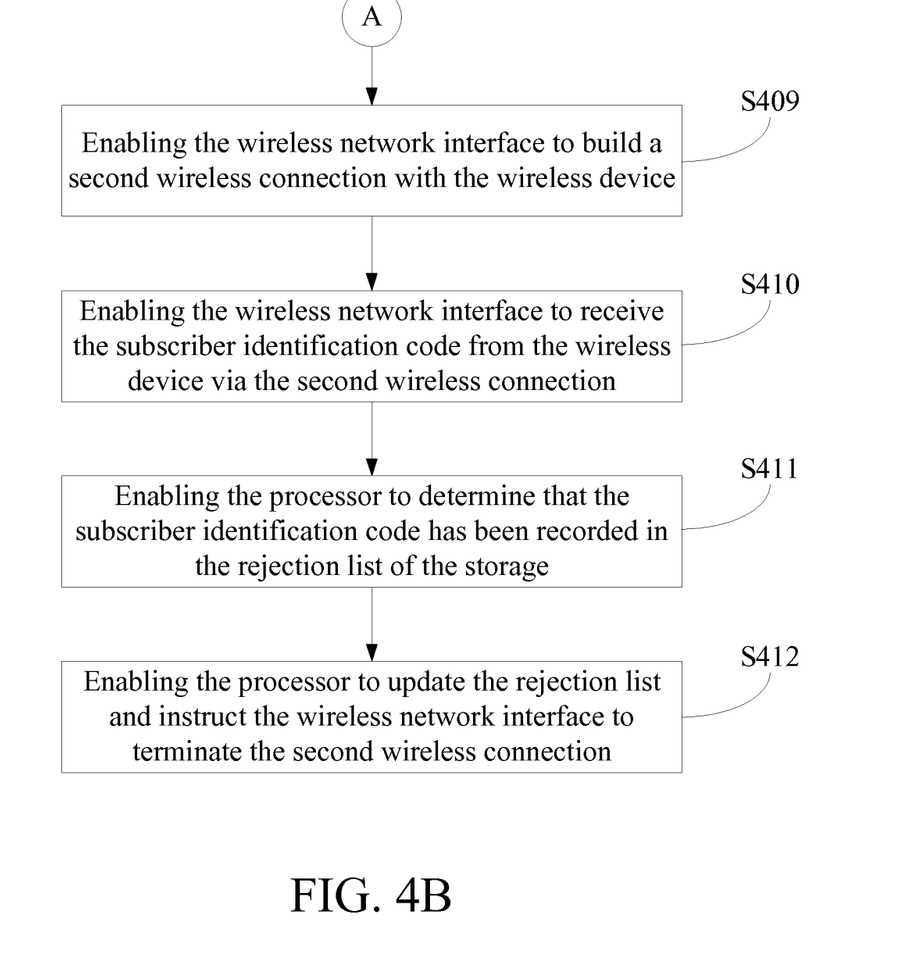
Figure 4C:
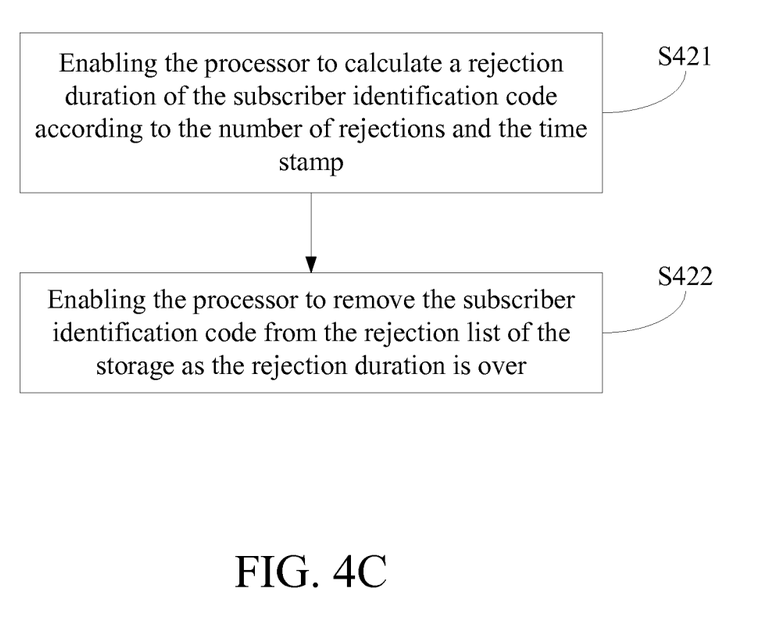
Figure 5:
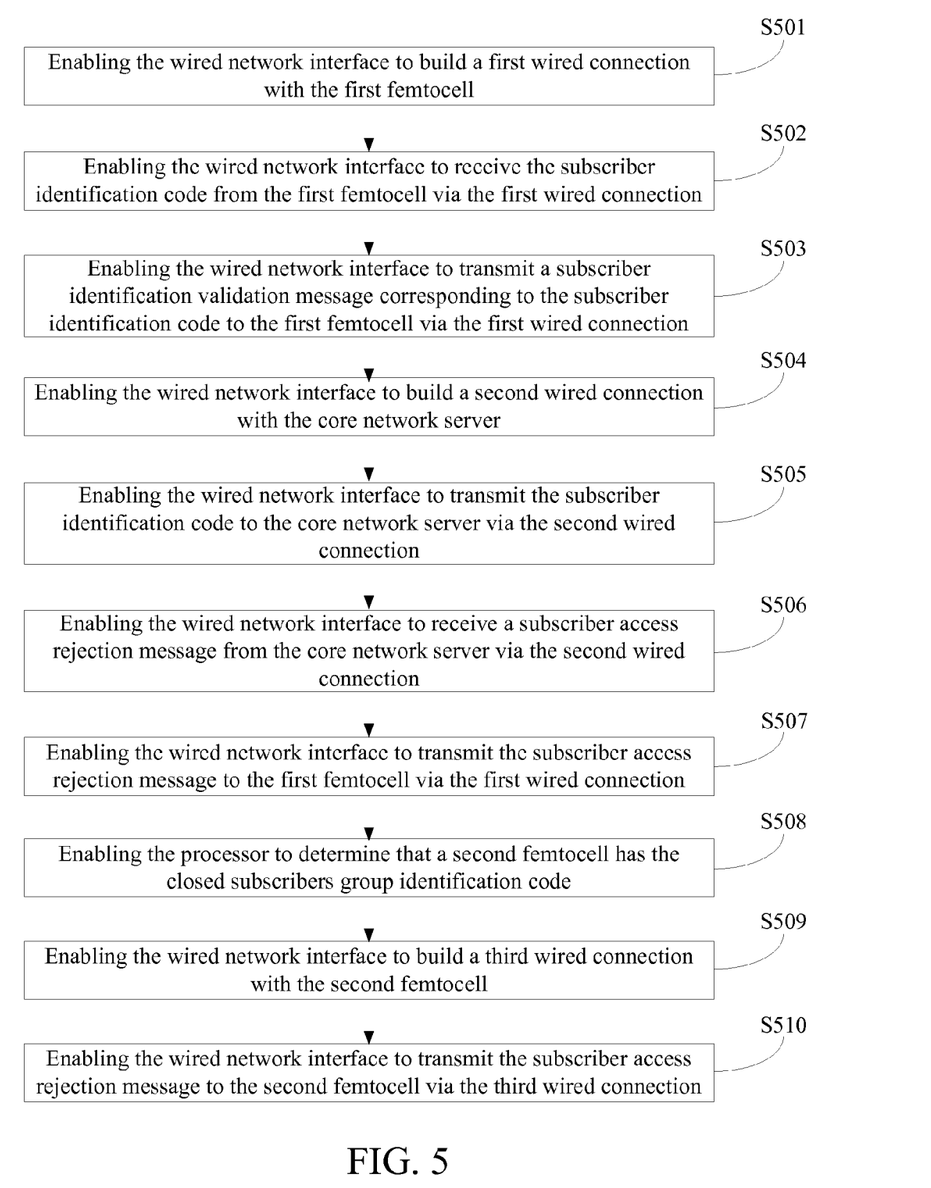
FIG. 5 is a flowchart diagram illustrating operations of a femtocell gateway according to the second embodiment.

A second embodiment of the present invention is an access rejection method for use in a wireless network system, which will be described with reference to FIG. 1, FIGS. 4A to 4C and FIG. 5 together. FIGS. 4A-4C depict a flowchart diagram illustrating operations of the femtocell according to the second embodiment, and FIG. 5 depicts a flowchart diagram illustrating operations of the femtocell gateway according to the second embodiment. The wireless network system comprises a wireless device having a subscriber identification code, a femtocell, a security gateway, a femtocell gateway and a core network server storing a closed subscribers group identification code of the femtocell. Further, the femtocell comprises a wireless network interface, a wired network interface, a storage and a processor electrically connected to the wireless network interface, the wired network interface and the storage. The femtocell gateway comprises a wired network interface and a processor electrically connected to the wired network interface.

It shall be appreciated that the wireless device, the femtocell, the security gateway, the femtocell gateway and the core network server of this embodiment may be the wireless device 11, the femtocell 13, the security gateway 15, the femtocell gateway 17 and the core network server 19 of the first embodiment respectively. Additionally, the access rejection method described in this embodiment may be implemented by a computer program product. When the computer program product is loaded into the femtocell 13 and the femtocell gateway 17 respectively and a plurality of codes comprised in the computer program product is executed, the access rejection method described in this embodiment can be accomplished. The computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Referring to FIGS. 4A to 4B, the access rejection method of the second embodiment will be described firstly from the viewpoint of the femtocell. Step S401 is executed to enable the wireless network interface to build a first wireless connection with the wireless device, and step S402 is executed to enable the wireless network interface to receive the subscriber identification code from the wireless device via the first wireless connection. Then, step S403 is executed to enable the wired network interface to build a wired connection with the femtocell gateway. Next, step S404 is executed to enable the wired network interface to transmit the subscriber identification code to the femtocell gateway via the wired connection, and step S405 is executed to enable the wired network interface to receive a subscriber identification validation message from the femtocell gateway via the wired connection. Afterwards, step S406 is executed to enable the wired network interface to receive a subscriber access rejection message coming from the core network server from the femtocell gateway via the wired connection. Thereafter, step S407 is executed to enable the storage to store the subscriber identification code in a rejection list, and step S408 is executed to enable the processor to record the subscriber identification code in the rejection list of the storage according to the subscriber access rejection message and instruct the wireless network interface to terminate the first wireless connection.

If the wireless device issues a verification request again, the femtocell further executes the following steps: step S409 is executed to enable the wireless network interface to build a second wireless connection with the wireless device; step S410 is executed to enable the wireless network interface to receive the subscriber identification code from the wireless device via the second wireless connection; then, step S411 is executed to enable the processor to determine that the subscriber identification code has been recorded in the rejection list; and step S412 is executed to enable the processor to update the rejection list and instruct the wireless network interface to terminate the second wireless connection.

Additionally, when the rejection list further has the number of rejections and a time stamp corresponding to the subscriber identification code stored therein, the femtocell further executes the following steps as depicted in FIG. 4C: step S421 is executed to enable the processor to calculate a rejection duration of the subscriber identification code according to the number of rejections and the time stamp, and step S422 is executed to enable the processor to remove the subscriber identification code from the rejection list of the storage as the rejection duration of the subscriber identification code is over.

Next, referring to FIG. 5, the access rejection method of the second embodiment will be described from the viewpoint of the femtocell gateway. Step S501 is executed to enable the wired network interface to build a first wired connection with the first femtocell. Then, step S502 is executed to enable the wired network interface to receive the subscriber identification code from the first femtocell via the first wired connection, and step S503 is executed to enable the wired network interface to transmit a subscriber identification validation message corresponding to the subscriber identification code to the first femtocell via the first wired connection. Thereafter, step S504 is executed to enable the wired network interface to build a second wired connection with the core network server, and step S505 is executed to enable the wired network interface to transmit the subscriber identification code to the core network server via the second wired connection. Afterwards, step S506 is executed to enable the wired network interface to receive a subscriber access rejection message from the core network server via the second wired connection, and step S507 is executed to enable the wired network interface to transmit the subscriber access rejection message to the first femtocell via the first wired connection.

Further speaking, because the femtocell gateway can transmit the subscriber access rejection message to other femtocells having the same closed subscribers group identification code, the femtocell gateway further executes the following steps: step S508 is executed to enable the processor to determine that a second femtocell has the closed subscribers group identification code; step S509 is executed to enable the wired network interface to build a third wired connection with the second femtocell; and step S510 is executed to enable the wired network interface to transmit the subscriber access rejection message to the second femtocell via the third wired connection.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

According to the above descriptions, the femtocell of the present invention can use a rejection list to reduce impacts caused by denial-of-service attacks initiated by a malicious user through repeated log-in attempts, and use a recovery mechanism to reduce the possibility that a legal user falsely determined as a malicious user is permanently rejected. Furthermore, the femtocell gateway of the present invention can extend the protection range by transmitting the subscriber access rejection message to femtocells having the same closed subscribers group identification code, thus resulting in an effect of synchronous rejection. Thereby, the femtocell, the femtocell gateway and the access rejection method thereof of the present invention can effectively reduce impacts caused by attacks from malicious users in the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A femtocell, a wireless network system comprising a wireless device, a femtocell gateway, a core network server and the femtocell, the wireless device having a subscriber identification code, the core network server storing a closed subscribers group identification code of the femtocell, the femtocell comprising:

a wireless network interface, being configured to build a first wireless connection with the wireless device, and to receive the subscriber identification code from the wireless device via the first wireless connection;

a wired network interface, being configured to build a wired connection with the femtocell gateway, to transmit the subscriber identification code to the femtocell gateway via the wired connection, to receive a subscriber identification validation message from the femtocell gateway via the wired connection, and to receive a subscriber access rejection message coming from the core network server from the femtocell gateway via the wired connection;

a storage, being configured to store a rejection list; and
a processor, being electrically connected to the wireless network interface, the wired network interface and the storage, and configured to record the subscriber identification code, the number of rejections, and a time stamp of the subscriber identification code in the rejection list of the storage according to the subscriber access rejection message, instruct the wireless network interface to terminate the first wireless connection, and calculate a rejection duration of the subscriber identification code according to the number of rejections and the time stamp.

2. The femtocell as claimed in claim 1, wherein the wireless network interface further builds a second wireless connection with the wireless device to receive the subscriber identification code from the wireless device via second wireless connection, and the processor updates the rejection list and instructs the wireless network interface to terminate the second wireless connection after determining that the subscriber identification code has been recorded in the rejection list.

3. The femtocell as claimed in claim 1, wherein the subscriber identification code is one of an international mobile subscriber identity code and a subscriber identity module code.

4. The femtocell as claimed in claim 1, wherein the wired network interface builds the wired connection through a security gateway so that security of the signals propagated between the wired network interface and the femtocell gateway is improved.

5. The femtocell as claimed in claim 1, wherein the processor removes the subscriber identification code from the rejection list of the storage as the rejection duration of the subscriber identification code is over.

6. An access rejection method for use in a femtocell, a wireless network system comprising a wireless device having a subscriber identification code, the femtocell, a femtocell gateway and a core network server storing a closed subscribers group identification code of the femtocell, the femtocell comprising a wireless network interface, a wired network interface, a storage and a processor electrically connected to the wireless network interface, the wired network interface, and the storage, the access rejection method comprising the steps of:
(a) enabling the wireless network interface to build a first wireless connection with the wireless device;
(b) enabling the wireless network interface to receive the subscriber identification code from the wireless device via the first wireless connection;
(c) enabling the wired network interface to build a wired connection with the femtocell gateway;
(d) enabling the wired network interface to transmit the subscriber identification code to the femtocell gateway via the wired connection;
(e) enabling the wired network interface to receive a subscriber identification validation message from the femtocell gateway via the wired connection;
(f) enabling the wired network interface to receive a subscriber access rejection message coming from the core network server from the femtocell gateway via the wired connection;
(g) enabling the storage to store a rejection list; and
(h) enabling the processor to record the subscriber identification code, the number of rejections, and a time stamp of the subscriber identification code in the rejection list of the storage according to the subscriber access rejection message;
(i) enabling the processor to instruct the wireless network interface to terminate the first wireless connection; and
(j) enabling the processor to calculate a rejection duration of the subscriber identification code according to the number of rejections and the time stamp.

7. The access rejection method as claimed in claim 6, further comprising the steps of:
(i) enabling the wireless network interface to build a second wireless connection with the wireless device;
(j) enabling the wireless network interface to receive the subscriber identification code from the wireless device via the second wireless connection;
(k) enabling the processor to determine that the subscriber identification code has been recorded in the rejection list; and
(l) enabling the processor to update the rejection list and instruct the wireless network interface to terminate the second wireless connection.

8. The access rejection method as claimed in claim 6, wherein the subscriber identification code is one of an international mobile subscriber identity code and a subscriber identity module code.

9. The access rejection method as claimed in claim 6, wherein the wired network interface builds the wired connection with the femtocell gateway through a security gateway so that security of the signals propagated between the wired network interface and the femtocell gateway is improved.

10. The access rejection method as claimed in claim 6, further comprising the steps of: (n) enabling the processor to remove the subscriber identification code from the rejection list of the storage as the rejection duration of the subscriber identification code is over.

* * * * *